2,734,076

PARTIAL ESTERS OF THE ALIPHATIC POLYHYDRIC ALCOHOLS WITH α,α-DICHLOROPROPIONIC ACID

Charles T. Pumpelly, Midland, Mich., assignor to The Dow Chemical Company, Midland, Mich., a corporation of Delaware No Drawing. Application April 22, 1954,
Serial No. 425,021

6 Claims. (Cl. 260—487)

The present invention relates to the partial esters of α,α-dichloropropionic acid and the polyhydric alcohols of the aliphatic series. These compounds are viscous liquids or crystalline solids which are somewhat soluble in many organic solvents and water. They have been found useful as intermediates for the preparation of more complex organic derivatives and as active toxic constituents of compositions for the control of blackhead in poultry. They are also useful as plant growth materials and adapted to be employed in dust and spray compositions for the control of the growth and the killing of weeds and for the sterilization of soil with regard to plant growth. Their use as intermediates is disclosed in a copending application, Serial No. 425,022 filed concurrently herewith.

The new compounds may be prepared by reacting together (1) α,α-dichloropropionic acid and (2) an aliphatic polyhydric alcohol such as glycerol, ethylene glycol, propylene glycol, trimethylene glycol, butylene glycol and the di- and tri-alkylene glycols of the ethylene, propylene and trimethylene series, i. e. diethylene glycol, triethylene glycol, dipropylene glycol, tripropylene glycol, di(trimethylene) glycol and tri(trimethylene) glycol. The reaction may be carried out in the presence of an esterification catalyst such as sulfuric acid or phenolsulphonic acid and conveniently in a water-immiscible solvent such as ethylene dichloride, mono-chlorobenzene or toluene. The employment of the proportion of at least one mole of polyhydric alcohol with an amount of acid equal in moles to one less than the number of hydroxyl units in the employed alcohol is essential for the accomplishment of the desired reaction, i. e. the synthesis of the partial esters. Thus, one molecular proportion of acid is reacted with at least one-half molecular proportion of glycerol or at least one molecular proportion of a glycol reagent. The employment of an excess of the polyhydric alcohol and the removal from the reaction zone of the water of reaction as formed generally results in optimum yields of the desired ester products.

In carrying out the reaction, the α,α-dichloropropionic acid, polyhydric alcohol and catalyst, if employed, are mixed together and the resulting mixture heated at a temperature of from about 90° to 150° C. for a period of time to complete the reaction. When operating at temperatures above the boiling temperature of water, the heating may be carried out under somewhat diminished pressure to remove the water of reaction as formed. In an alternative method, the α,α-dichloropropionic acid, polyhydric alcohol and catalyst, if employed, may be dispersed in the inert organic solvent and the resulting mixture heated at the boiling temperature. During the reaction a mixture of solvent and water of reaction may be continuously distilled out of the reaction vessel, condensed and the solvent recovered. Additional solvent may be introduced into the reaction zone as may be necessary. Upon completion of the reaction, the desired product may be separated by fractional distillation under reduced pressure.

The ethylene glycol, propylene glycol and butylene glycol mono(α,α-dichloropropionates) may be prepared in an alternative procedure by reacting one molecular proportion of α,α-dichloropropionic acid with at least one molecular proportion of ethylene oxide, propylene oxide or butylene oxide. The contacting of the reactants conveniently may be carried out in an inert organic solvent such as benzene or toluene. The reaction is somewhat exothermic and takes place smoothly at temperatures of from 40° to 130° C. The temperature may be controlled by regulating the rate of contacting the reactants and by the addition and subtraction of heat, if required. In carrying out the reaction, one reactant is added portionwise to the other at a temperature of from 40° to 130° C. and the resulting mixture maintained within this same temperature range for a period of time to complete the reaction. Following the reaction the desired ester product may be separated from the mixture by fractional distillation under reduced pressure.

The following examples illustrate the invention but are not to be construed as limiting:

Example 1

372 grams (6 moles) of ethylene glycol and 286 grams (2 moles) of 97 percent α,α-dichloropropionic acid were dispersed in 250 milliliters of ethylene dichloride and the resulting mixture heated for 16 hours at a temperature of from 105° to 111° C. The heating was carried out with continuous distillation of ethylene dichloride together with the water of reaction as formed, separation of the water and recycling of the ethylene dichloride. The resulting reaction mixture was then distilled at atmospheric pressure to recover a portion of the ethylene dichloride and the residue thereafter fractionally distilled under reduced pressure to separate an ethylene glycol mono(α,α-dichloropropionate) product as a viscous liquid. The latter had a boiling point of 107.5°–109° C. at 9 millimeters pressure, a refractive index $n/D$ of 1.4635 at 25° C., a specific gravity of 1.3526 at 25°/25° C. and a chlorine content of 37.48 percent.

Example 2

232 grams (4 moles) of propylene oxide was added portionwise to 572 grams (4 moles) of α,α-dichloropropionic acid over a period of 3 hours. The addition was carried out with stirring and cooling and at a temperature of from 50° to 60° C. Following the addition, the reaction mixture was heated for 13 hours at 60° C. and the temperature thereafter increased to 127° C. over a short period of time to complete the reaction. The reaction mixture was then fractionally distilled under reduced pressure to separate a propylene glycol mono(α,α-dichloropropionate) product as a viscous liquid boiling at 55°–60° C. at 0.3–0.35 millimeter pressure. This product had a refractive index $n/D$ of 1.4576 at 25° C., a specific gravity of 1.2780 at 25°/25° C. and a chlorine content of 35.2 percent.

Example 3

184 grams (2 moles) of glycerol and 572 grams (4 moles of α,α-dichloropropionic acid were dispersed in 300 milliliters of ethylene dichloride and the resulting mixture heated for 43 hours at the boiling temperature. The reaction mixture was then fractionally distilled under reduced pressure through a 1 inch by 16 inch Vigreux column to separate a 110 gram fraction at a pot temperature of 167°–176° C. and a head temperature of 130°–142° C. at 0.15–0.25 millimeter pressure. This fraction was obtained under conditions of somewhat rapid boiling of the reaction product and super heating of the distillation vapors. When this fraction was cooled to room temperature a white amorphous solid precipitated therein. The latter was separated by filtration and thereafter recrystallized from carbon tetrachloride to obtain a glycerol mono($\alpha,\alpha$-dichloropropionate) product as a white crystalline solid melting at 67°–69° C. and having a chlorine content of 32.7 percent.

In the above distillation, a second fraction (352 grams) boiling at 145°–153° C. at 0.15–0.3 millimeter pressure was separated. This fraction was diluted with a small quantity of ethylene dichloride and the solvent mixture washed several times with water. The washed product was then fractionally distilled under reduced pressure through a 1 inch by 20 inch vacuum jacketed column packed with ¼ inch glass helices to separate a glycerol di($\alpha,\alpha$-dichloropropionate) product as a viscous liquid. The latter had a boiling point of 143°–146° C. at 1.3 millimeters pressure, a refractive index $n/D$ of 1.4800 at 25° C., a specific gravity of 1.4163 at 25°/25° C. and a chlorine content of 42.2 percent.

*Example 4*

424 grams (4 moles) of diethylene glycol and 286 grams (2 moles) of $\alpha,\alpha$-dichloropropionic acid were dispersed in 300 milliliters of ethylene dichloride and the resulting mixture heated for 13 hours at a temperature of from 138° to 143° C. The heating was carried out with continuous distillation of ethylene dichloride together with the water of reaction as formed, separation of the water and recycling of ethylene dichloride. The resulting mixture was fractionally distilled under reduced pressure to separate a diethylene glycol mono($\alpha,\alpha$-dichloropropionate) product as a viscous liquid. The latter had a boiling point of 148°–150° C. at 9 millimeters pressure, a refractive index $n/D$ of 1.464 at 25° C., a specific gravity of 1.2846 at 25°/25° C. and a saponification index of 224.

*Example 5*

536 grams (4 moles) of dipropylene glycol (boiling at 227°–235° C. at atmospheric pressure) and 286 grams (2 moles) of $\alpha,\alpha$-dichloropropionic acid were dispersed in 800 milliliters of ethylene glycol and the resulting mixture heated for 24 hours at a temperature of from 100° to 108° C. The heating was carried out with continuous distillation of ethylene dichloride together with the water of reaction as formed, separation of the water and recycling of ethylene dichloride. The reaction product was then fractionally distilled under reduced pressure to separate a dipropylene glycol mono($\alpha,\alpha$-dichloropropionate) product as a viscous liquid. The latter had a boiling point of 134°–135° C. at 7–8 millimeters pressure, a refractive index $n/D$ of 1.4535 at 25° C., a specific gravity of 1.1959 at 25°/25° C. and a saponification index of 248.

*Example 6*

343 grams (4.5 moles) of trimethylene glycol and 286 grams (2 moles) of $\alpha,\alpha$-dichloropropionic acid were dispersed in 400 milliliters of ethylene dichloride and the resulting mixture heated in the previously described manner for about 5 hours at a temperature of 110° C. Following the heating period, the mixture was fractionally distilled under reduced pressure to separate a trimethylene glycol mono($\alpha,\alpha$-dichloropropionate) product as a viscous liquid. The latter had a boiling point of 119°–120° C. at 10 millimeters pressure, a refractive index $n/D$ of 1.4618 at 25° C., a specific gravity of 1.2779 at 25°/25° C. and a saponification index of 206.

*Example 7*

600 grams (4 moles) of triethylene glycol and 286 grams (2 moles) of $\alpha,\alpha$-dichloropropionic acid were dispersed in 800 milliliters of ethylene dichloride and the resulting mixture heated in the usual fashion for 24 hours at a temperature of from 114° to 116° C. The mixture was then fractionally distilled under reduced pressure to separate a triethylene glycol mono($\alpha,\alpha$-dichloropropionate) product as a viscous liquid boiling at 162°–169° C. at 6 millimeters pressure, and having a refractive index $n/D$ of 1.4630 at 25° C. and a specific gravity of 1.2364 at 25°/25° C.

The products of the preceding examples have been tested and found effective as herbicides, i. e. for the killing of weeds and for the sterilization of soil with regard to plant growth. For such use the products may be dispersed on an inert finely divided solid and employed as dusts. Also, such mixtures may be dispersed in water with or without the aid of a wetting agent and the resulting aqueous suspensions employed as sprays. In other procedures the products may be employed as constituents in oil-in-water emulsions or aqueous dispersions with or without the addition of wetting, dispersing or emulsifying agents.

The di- and tri-ethylene glycols employed as starting materials as previously described may be prepared by reacting ethylene glycol with ethylene oxide. The reaction may be carried out in the presence of a catalyst such as sodium hydroxide. In one such method, the reactants are mixed together in the presence of the catalyst and heated for about 0.5 hour at a temperature of 170° C. and a pressure of 200 pounds per square inch. The individual glycols can then be separated by subjecting the mixed reaction product to fractional distillation under reduced pressure.

1-(2-hydroxypropoxy)-2-propanol may be similarly prepared by reacting 1,2-propanediol with propylene oxide in the presence of sodium hydroxide, since propylene oxide reacts much faster with a primary alcohol than with a secondary alcohol, and in the presence of the alkaline catalyst, the oxide adds largely as a secondary alcohol. 2-(2-hydroxypropoxy)-1-propanol may be prepared by reacting 1-methoxy-2-propanol with propylene oxide in the presence of alkaline catalyst to produce 1-(2-methoxyisopropoxy)-2-propanol. The latter product is thereafter heated with hydrogen bromide to give the desired dipropylene glycol and methyl bromide. 2-(2-hydroxy)-1-methylethoxy)-1-propanol may be prepared by the reduction of diethyl dilactylate with lithium aluminum hydride (LiAlH$_4$). The trialkylene glycols of the propylene series may be prepared by reacting these dipropylene glycols with propylene oxide in the presence of sodium hydroxide as catalyst.

The di- and tri-alkylene glycols of the trimethylene series may be prepared by heating 1,3-propanediol with a dehydration catalyst such as iodine. The heating is carried out a temperature of about 175° C. and with the continuous distillation and collection of water of reaction. Upon completion of the reaction as evidenced by the amount of water collected, the mixture may be extracted with a suitable organic solvent and the solvent extract fractionally distilled under reduced pressure to obtain the desired product.

The term "butylene glycol" is construed in the present specification and claims to be inclusive of 1,2-dibutylene glycol, 1,3-dibutylene glycol, 2,3-butylene glycol and 1,4-butylene glycol. The term "alkylene" as employed herein refers to any bivalent aliphatic hydrocarbon radical having two free valences attached to different carbon atoms. The polyhydric alcohols to be employed in accordance with the teachings of the specification and claims are those alcohols which are free of reactive groups other than hydroxyl.

I claim:

1. A partially esterified reaction product of $\alpha,\alpha$-dichloropropionic acid with a polyhydric alcohol selected from the group consisting of glycerol, ethylene glycol, propylene glycol, trimethylene glycol, butylene glycol and the di- and tri-alkylene glycols of the ethylene, propylene and trimethylene series.
2. Ethylene glycol mono($\alpha,\alpha$-dichloropropionate)
3. Propylene glycol mono($\alpha,\alpha$-dichloropropionate)
4. Diethylene glycol mono($\alpha,\alpha$-dichloropropionate)
5. Glycerol mono($\alpha,\alpha$-dichloropropionate)
6. Glycerol di($\alpha,\alpha$-dichloropropionate)

References Cited in the file of this patent
UNITED STATES PATENTS

| | | |
|---|---|---|
| 2,257,021 | Pollack | Sept. 23, 1941 |
| 2,642,354 | Barrons | June 16, 1953 |